(12) United States Patent
Lu et al.

(10) Patent No.: US 12,158,947 B2
(45) Date of Patent: Dec. 3, 2024

(54) MALWARE ANALYSIS THROUGH VIRTUAL MACHINE FORKING

(71) Applicant: Palo Alto Networks, Inc., Santa Clara, CA (US)

(72) Inventors: Chien-Hua Lu, San Jose, CA (US); Ryan Carroll Salsamendi, Campbell, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 605 days.

(21) Appl. No.: 16/945,104

(22) Filed: Jul. 31, 2020

(65) Prior Publication Data

US 2022/0035905 A1 Feb. 3, 2022

(51) Int. Cl.
| | |
|---|---|
| *G06F 21/00* | (2013.01) |
| *G06F 9/455* | (2018.01) |
| *G06F 21/53* | (2013.01) |
| *G06F 21/56* | (2013.01) |

(52) U.S. Cl.
CPC .......... *G06F 21/53* (2013.01); *G06F 9/45558* (2013.01); *G06F 21/566* (2013.01); *G06F 2009/45562* (2013.01); *G06F 2009/45587* (2013.01); *G06F 2009/45595* (2013.01); *G06F 2221/033* (2013.01)

(58) Field of Classification Search
None
See application file for complete search history.

(56) References Cited

U.S. PATENT DOCUMENTS

| | | |
|---|---|---|
| 7,313,793 B2 | 12/2007 | Traut et al. |
| 8,151,263 B1 | 4/2012 | Venkitachalam et al. |
| 10,530,810 B2 * | 1/2020 | Ettema ................ H04L 63/1425 |
| 10,564,996 B2 * | 2/2020 | Tarasuk-Levin ...... G06F 9/5077 |
| 10,565,376 B1 * | 2/2020 | Jung ..................... G06F 11/302 |
| 10,628,586 B1 * | 4/2020 | Jung ................... G06F 11/3037 |
| 10,846,404 B1 * | 11/2020 | Salsamendi ........... G06F 21/566 |
| 2007/0074208 A1 * | 3/2007 | Ling ................... G06F 9/45558 |
| | | 718/1 |
| 2008/0098154 A1 * | 4/2008 | Traut .................... G06F 9/4856 |
| | | 718/1 |

(Continued)

OTHER PUBLICATIONS

GCF Global, "What is an operating system?", Aug. 7, 2020; https://edu.gcfglobal.org/en/computerbasics/understanding-operating-systems; p. 1-5; accessed via webarchive.org, https://web.archive.org/web/20200807182458/https://edu.gcfglobal.org/en/computerbasics/understanding-operating-systems/1/ (Year: 2020).*

(Continued)

*Primary Examiner* — Jeffery L Williams
(74) *Attorney, Agent, or Firm* — Gilliam IP PLLC

(57) ABSTRACT

A set of virtual machines (VMs) with different guest operating systems installed is initially booted and prepared to facilitate rapid creation, or "forking," of a child VM(s) for malware analysis of a software sample. Because malicious code may be packaged for a specific operating system version, subsets of the VMs may have different versions of the same guest operating system installed. Upon detection of a sample indicated for malware analysis, a child VM(s) running the appropriate guest operating system is created based on a corresponding one(s) of the set of VMs. A process in which the corresponding VM(s) has been booted is forked to create a child process. A child VM which is a copy of the VM booted in the parent process is then created in the child process. The sample is then sandboxed in the child VM for analysis to determine if the sample comprises malware.

20 Claims, 7 Drawing Sheets

(56) References Cited

U.S. PATENT DOCUMENTS

| | | | |
|---|---|---|---|
| 2013/0080480 A1* | 3/2013 | Mao | H04L 67/10 707/E17.044 |
| 2014/0337836 A1 | 11/2014 | Ismael | |
| 2017/0249188 A1* | 8/2017 | Saladi | G06F 9/5088 |
| 2018/0060104 A1 | 3/2018 | Tarasuk-Levin et al. | |
| 2018/0124069 A1* | 5/2018 | Ettema | H04L 63/145 |
| 2021/0081372 A1* | 3/2021 | Lee | G06F 16/23 |
| 2022/0035905 A1* | 2/2022 | Lu | G06F 21/53 |
| 2022/0129554 A1* | 4/2022 | Jung | G06F 21/566 |

OTHER PUBLICATIONS

Wikipedia, "List of Microsoft Windows Versions", Jan. 5, 2019, https://en.wikipedia.org/wiki/List_of_Microsoft_Windows_versions; p. 1-12; accessed via webarchive.org, https://web.archive.org/web/20190105065755/https://en.wikipedia.org/wiki/List_of_Microsoft_Windows_versions (Year: 2019).*

Bhayani, Arpit, "Copy-on-Write Semantics", May 3, 2020, https://arpitbhayani.me/blogs/copy-on-write/; accessed via https://web.archive.org/web/20200721110017/https://arpitbhayani.me/blogs/copy-on-write/, on Jul. 31, 2023, p. 1-14. (Year: 2020).*

Lagar-Cavilla, et al., "SnowFlock: Rapid Virtual Machine Cloning for Cloud Computing", Proceedings of the 4th ACM European conference on Computer systems, 2009, 12 pages.

PCT Application No. PCT/US2021/071081 International Search Report, Nov. 19, 2021, 4 pages.

PCT Application No. PCT/US2021/071081 International Written Opinion, Nov. 19, 2021, 5 pages.

EP Application No. 21762314.9, Office Action, mailed Nov. 9, 2023, 5 pages.

* cited by examiner

MALWARE ANALYSIS THROUGH VIRTUAL MACHINE FORKING

BACKGROUND

The disclosure generally relates to electric digital data processing and to creating, deleting, and cloning virtual machine instances.

Analysis of potential malware is commonly performed by analyzing behavior of software (e.g., executable files and other file types, links, applets, etc.) in a sandbox to facilitate identification of threats while isolating the software from the host machine. Sandboxes can be implemented using virtual machines. When using a virtual machine for sandboxing potential malware, the virtual machine is launched and the potential malware is loaded into the virtual machine for analysis of its behavior, such as based on monitoring execution or otherwise manipulating the software within the virtual machine. Multiple virtual machines may also be provisioned for malware analysis, such as by creating a virtual machine pool in advance or through implementing virtual machine cloning.

BRIEF DESCRIPTION OF THE DRAWINGS

Embodiments of the disclosure may be better understood by referencing the accompanying drawings.

DESCRIPTION

Figure 1:
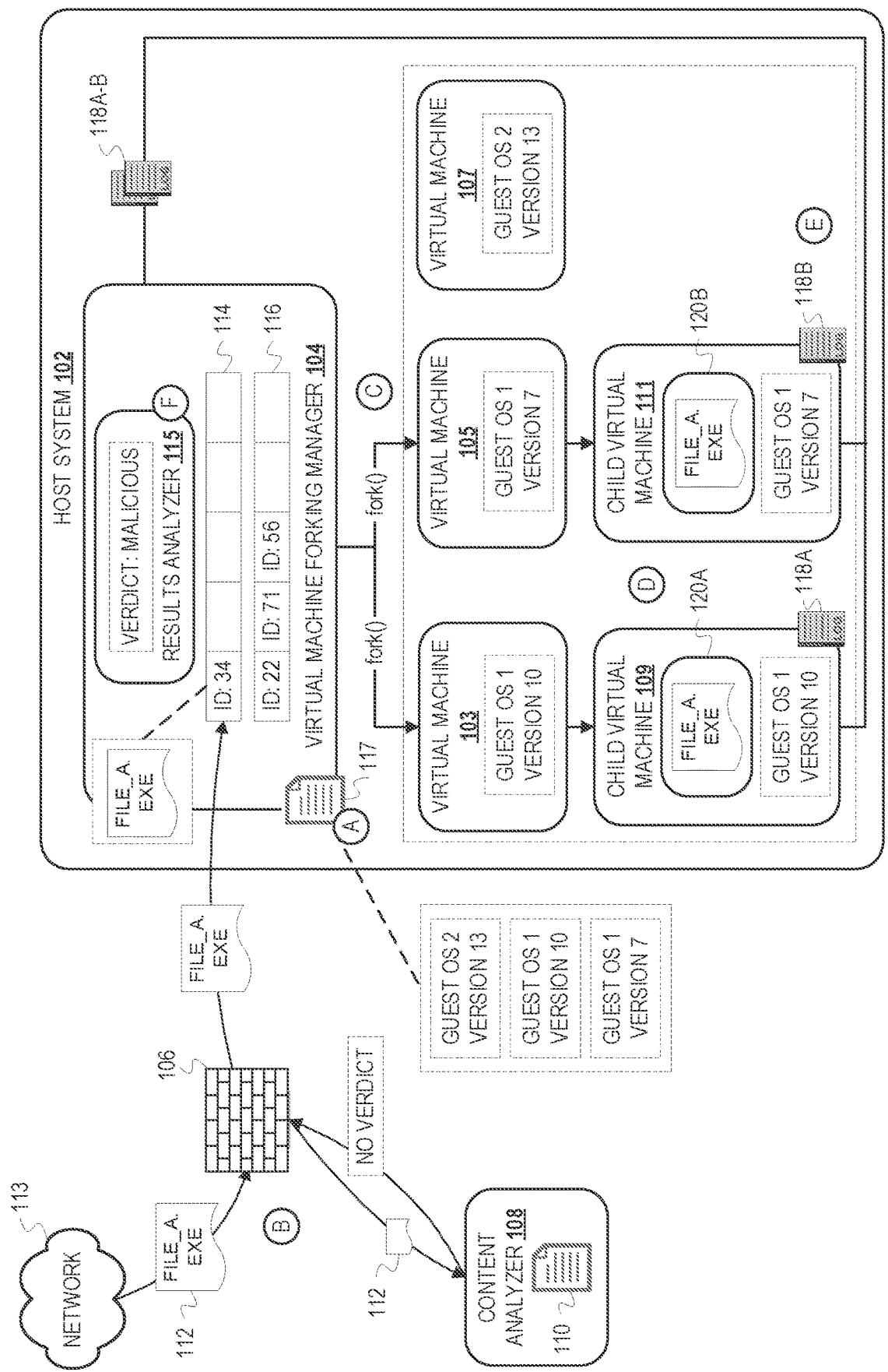
FIG. 1 depicts a conceptual diagram of rapid context tailored sandbox generation for malware analysis.

The description that follows includes example systems, methods, techniques, and program flows that embody aspects of the disclosure. However, it is understood that this disclosure may be practiced without these specific details. For instance, this disclosure refers to performing malware analysis of software samples detected by a firewall in illustrative examples. Aspects of this disclosure can be also applied to detection of software samples by other network devices which can monitor network traffic. In other instances, well-known instruction instances, protocols, structures and techniques have not been shown in detail in order not to obfuscate the description.

Overview

Using a single virtual machine for malware analysis of multiple software samples (e.g., program code detected or identified from network traffic) necessitates that the virtual machine boot and a preparation process be repeated for each sample, which is costly in terms of both time and resources. Additionally, the time required to boot the virtual machine, prepare the analysis environment, and complete the analysis for a sample creates a window of vulnerability to attack, possibly lasting several minutes. While existing techniques for sandbox analysis provide for the use of multiple virtual machines, these techniques also present shortcomings. Creating a virtual machine pool in advance can result in underprovisioning and overprovisioning of resources. If resources are underprovisioned, additional virtual machines must be created with the resource- and time-intensive process of booting and preparing a new virtual machine(s). If resources are overprovisioned, resources are wasted. Further, virtual machine cloning is a rigid approach that may require that the system architecture be adapted to the implementation.

To quickly provision virtual machines for malware analysis of incoming samples without the flaws of existing solutions, a technique for virtual machine forking has been developed. A process in which a virtual machine has been booted and its guest operating system installed is forked to create a child process. A "child virtual machine" which is a copy of the virtual machine booted in the parent process (or the "parent virtual machine") is then created in the child process. The resulting child virtual machine is already booted with the same guest operating system installed as the parent from which it was forked, thus substantially reducing the time conventionally required to boot a new virtual machine. Initially booting and preparing a set of virtual machines with different guest operating systems installed allows a child virtual machine with an appropriate guest operating system to be rapidly created from a corresponding one of the parent virtual machines. Because malicious code may be packaged for a specific operating system version, subsets of the virtual machines may have different versions of the same guest operating system installed to increase the accuracy with which threats are correctly detected and identified. Upon detection of a new sample to be analyzed, the virtual machine(s) running the appropriate guest operating system is "forked" to create a child virtual machine which is independent of the parent virtual machine and has the same guest operating system installed. The sample is then sandboxed in the child virtual machine for analysis of its behavior, and logs generated during the analysis can be evaluated to determine if the sample comprises malware.

The technique of forking a virtual machine to create a child virtual machine is based on issuing a fork system call from the process in which the parent virtual machine was booted during setup of the initial set of virtual machines, where the fork implements copy-on-write for improved performance. A "deep copy" of the virtual CPU registers of the parent virtual machine is created such that the virtual CPU register data is copied to the registers corresponding to the virtual CPU of the child virtual machine rather than references to the data alone. Copying of pages of memory and the virtual disk between the parent and child is handled by initially providing the child with a read-only copy of the memory and virtual disk of the parent and deferring copy operations until the first write attempt in the child process to further improve performance. The resulting child virtual machine that is forked from the parent virtual machine is a copy of the parent virtual machine yet exists in a separate process. This also maintains a "clean" base image of the parent virtual machine between virtual machine fork operations because the malware analysis is performed in the child virtual machine with the parent resources marked read-only.

Example Illustrations

FIG. 1 depicts a conceptual diagram of rapid context tailored sandbox generation for malware analysis. FIG. 1 depicts a virtual machine forking manager ("VM forking manager") 104 which executes on a host system 102. The VM forking manager 104 facilitates creation of virtual machines through forking a process of a "parent" virtual machine to provide a controlled execution environment for malware analysis of software samples (hereinafter "samples"). The VM forking manager 104 can communicate with a hypervisor 121 installed on the host system 102 which manages creation of virtual machines and execution of guest operating systems. The VM forking manager 104 maintains one or more queues for samples indicated for malware analysis, where individual queues may correspond to individual sample types. In this example, the VM forking manager 104 maintains queues 114, 116 for queueing portable executable (PE) files and command files, respectively, although additional queues for different types of samples may also be maintained. The VM forking manager 104 includes a results analyzer 115 which analyzes log data generated during analysis of the sample in one or more child virtual machines which have been "forked" from a respective parent virtual machine to provide a verdict as to whether the sample is malware. FIG. 1 also depicts a content analyzer 108 which analyzes incoming samples detected by a firewall 106 based on a set of heuristics to determine whether a sample is malware without analyzing behavior of the sample (e.g., through sandbox analysis). The content analyzer 108 may be a service which is separate from the firewall 106, a software process which executes as part of the firewall 106, etc.

FIG. 1 is annotated with a series of letters A-F. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the VM forking manager 104 launches virtual machines 103, 105, 107 instantiated with different operating systems and/or operating system versions. The VM forking manager 104 maintains a configuration file 117 which indicates operating systems and a corresponding version(s) which should be installed on each of a set of virtual machines. In this example, the configuration file 117 indicates versions 7 and 10 of a first guest operating system and version 13 of a second guest operating system to be installed on respective virtual machines. The VM forking manager 104 instantiates the virtual machines 103, 105, 107 which each run respective one of the guest operating systems indicated in the configuration file 117. For instance, the VM forking manager 104 can execute a script(s) to create each of the virtual machines 103, 105, 107 and, for each virtual machine, install an operating system on the virtual machine which is indicated in the configuration file 117 (e.g., based on a file path indicated in the configuration file 117).

At stage B, the firewall 106 detects a file 112 and communicates the file 112 to the content analyzer 108. The firewall 106 monitors and controls network traffic incoming from a network 113 (e.g., a public network). While monitoring incoming network traffic, the firewall 106 detects the file 112, which is a PE file in this example. The firewall 106 passes the file 112 to the content analyzer 108 for an initial evaluation to determine if the file 112 is malware without analyzing behavior of the file 112 (i.e., in a virtual machine). The content analyzer 108 analyzes the file 112 based on a set of heuristics 110. For instance, the content analyzer 108 can analyze the file 112 by generating a hash value of the file 112 and evaluating the hash value based on the heuristics 110. If the initial analysis by the content analyzer 108 yields a verdict that the file 112 is benign or malicious, the firewall 106 can allow or block the file 112 accordingly. As depicted in this example, if the analysis by the content analyzer 108 does not yield a verdict for the file 112, the firewall 106 forwards the file 112 to the VM forking manager 104 for further analysis. The file 112 is queued in the queue 114 for subsequent monitoring of its behavior in a virtual machine. The VM forking manager 104 may be configured to identify the type of an incoming sample to determine which of the queues 114, 116 in which to queue the sample. For instance, the VM forking manager 104 may identify that the file 112 is a PE file and place an identifier (ID) of the file 112 in the queue 114.

At stage C, the VM forking manager 104 issues an instruction to fork a child virtual machine 109 and a child virtual machine 111 from the virtual machine 103 and the virtual machine 105, respectively. The VM forking manager 104 determines an operating system with which the file 112 is compatible and determines which of the virtual machines 103, 105, 107 has been instantiated with the compatible operating system. In determining which of the virtual machines 103, 105, 107 has been instantiated with the compatible operating system, the VM forking manager 104 may determine that multiple virtual machines of the set of virtual machines 103, 105, 107 have each been instantiated with the compatible operating system. In this example, the VM forking manager 104 determines that the file 112 is compatible with a first guest operating system (depicted as "guest OS 1") and that the virtual machines 103, 105 have installed different versions of the first guest operating system. The VM forking manager 104 may issue an instruction to quiesce or pause the virtual machines 103, 105, where the pausing or quiescing may be temporary. The VM forking manager 104 then issues a fork of each of the virtual machines 103, 105 to create child processes in which respective child virtual machines 109, 111 can be created. For instance, upon issuance of a fork by the VM forking manager 104, a fork system call can be made by each of the processes of the virtual machines 103, 105. The fork system call which is issued is implemented with copy-on-write of physical memory pages so that rather than copying the physical memory pages of the parent processes (i.e., the processes of the virtual machines 103, 105) during creation of the child processes, virtual memory of the parent and child processes reference the same physical memory, and copying is deferred until the first write attempt made in the child processes. For instance, upon issuance of the fork system call by the processes of the virtual machines 103, 105, memory pages allocated to the parent processes can be marked as read-only (e.g., in the respective page table entries) and a count of references to each page of physical memory initialized. This can be considered to provide a snapshot of the memory state for each of the virtual machines 103, 105 at the time of the fork which the corresponding child processes of the child virtual machines 109, 111 can reference as read-only data.

After the processes are forked, the virtual CPU and virtual disk of each of the child virtual machines 109, 111 are then respectively prepared based on those of the virtual machines 103, 105 so the child virtual machines 109, 111 can operate independently of their respective parent virtual machine. When creating the child virtual machines 109, 111, data accessible to a virtual central processing unit (CPU) of each of the virtual machines 103, 105 (e.g., data stored in registers) is copied to a virtual CPU allocated to a respective one of the child virtual machines 109, 111 through a "deep copy." To perform a deep copy of a virtual CPU of a parent virtual machine such as one of the virtual machines 103, 105, copies of data stored in registers corresponding to the virtual CPU of the parent are created and stored in registers of the virtual CPU allocated to the child virtual machine. This is as opposed to copying references to the stored data alone (i.e., as analogous to creating a shallow copy in object copying). Accordingly, a deep copy is performed to copy data stored in registers of the virtual CPU of each of the virtual machines 103, 105 into registers corresponding to the virtual CPU allocated to each of the child virtual machines 109, 111. A deep copy of hardware-assisted virtualization structures of the virtual machines 103, 105 may similarly be performed for the child virtual machines 109, 111 (e.g., deep copies of the virtual machine control structure data, pointer(s) for nested paging implementations, etc.). Copying of the virtual disk between each of the virtual machines 103, 105 and the corresponding one of the child virtual machines 109, 111 is also handled by providing the child process with a read-only version of the data stored on the virtual disks. During the fork of each of the virtual machines 103, 105, a snapshot of the virtual disk of each virtual machine can be created to provide a read-only copy of the data written to the virtual disk by the respective parent process for reference by each of the child virtual machines 109, 111. Delta disks may then be created for each of the child virtual machines 109, 111 for use as a writable disk. Requested disk write operations made by the guest operating systems of each of the child virtual machines 109, 111 can then be redirected to the respective delta disk on the first write attempt. The virtual machines 103, 105 may be resumed following the fork of the child virtual machines 109, 111.

At stage D, the VM forking manager 104 loads the file 112 into each of the child virtual machines 109, 111 for monitoring of its behavior. Behavior of a sample which has been loaded into a child virtual machine and executed or otherwise manipulated can be monitored and recorded to logs generated for the child virtual machine. For instance, a sample can be monitored based on executing one or more test cases that are determined based on the type of the sample. In this example, after the VM forking manager 104 loads the file 112 into each of the child virtual machines 109, 111, the file is opened using software 120A, 120B for viewing executable files, respectively. Behavior of the file 112 resulting from opening and/or manipulating the file 112 within the child virtual machines 109, 111 is monitored and recorded to generate log data 118A, 118B, respectively (collectively the "log data 118A-B"). The log data 118A-B indicate behavior associated with the file 112 based on monitoring the file 112 within each of the child virtual machines 109, 111. While monitoring and recording behavior of the file 112, the virtual disk and memory pages of the virtual machines 103, 105 can be accessed as read-only data. Because copying of these components of the virtual machines 103, 105 and their respective processes was implemented with copy-on-write as described in reference to stage C, first writes to the virtual disk can be redirected to the delta disk, and first writes to the read-only memory pages can be intercepted and new physical memory pages allocated for performing the write operation. This allows for maintaining a "clean" base image between virtual machine forking and sample monitoring operations.

At stage E, the results analyzer 115 collects the log data 118A-B, and the child virtual machines 109, 111 are terminated. The results analyzer 115 collects the log data 118A-B for evaluation to determine whether the file 112 is malware (e.g., via agents loaded on the child virtual machines 109, 111). The child virtual machines 109, 111 are then terminated such as by terminating the child processes forked from the processes of the virtual machines 103, 105. Upon termination of the child virtual machines 109, 111, delta disks created for the child virtual machines 109, 111 may be deleted and the physical memory pages written to by the respective child processes via copy-on-write indicated as available (e.g., based on decrementing the reference count to zero).

At stage F, the results analyzer 115 determines if the file 112 comprises malware based on analysis of the log data 118A-B. The results analyzer 115 analyzes the log data 118A-B to determine if the execution behavior associated with the file 112 indicates that the file 112 is malware. For instance, the results analyzer 115 can evaluate behavior patterns indicated in the log data 118A-B against behavior patterns indicated in rules or other criteria for malware identification to determine whether behavior patterns of the file 112 observed in at least a first of the child virtual machines 109, 111 satisfy a first of the rules or criteria. Because malware may be packaged for a specific version(s) of an operating system, a determination that the log data recorded for at least one of the child virtual machines 109, 111 is indicative of malicious behavior can trigger a determination by the results analyzer 115 that the file 112 is malware. For example, a determination that the behavior recorded in the log data 118A of the child virtual machine 109 is indicative of malicious activity but the behavior recorded in the log data 118B of the child virtual machine 111 is not indicative of malicious activity may still trigger an indication by the results analyzer 115 that the file 112 is malware. In this example, the results analyzer 115 determines that the behavior patterns of the file 112 reflected in the log data 118A-B are indicative of malicious behavior and thus provides a verdict that the file 112 is malware.

Figure 2:
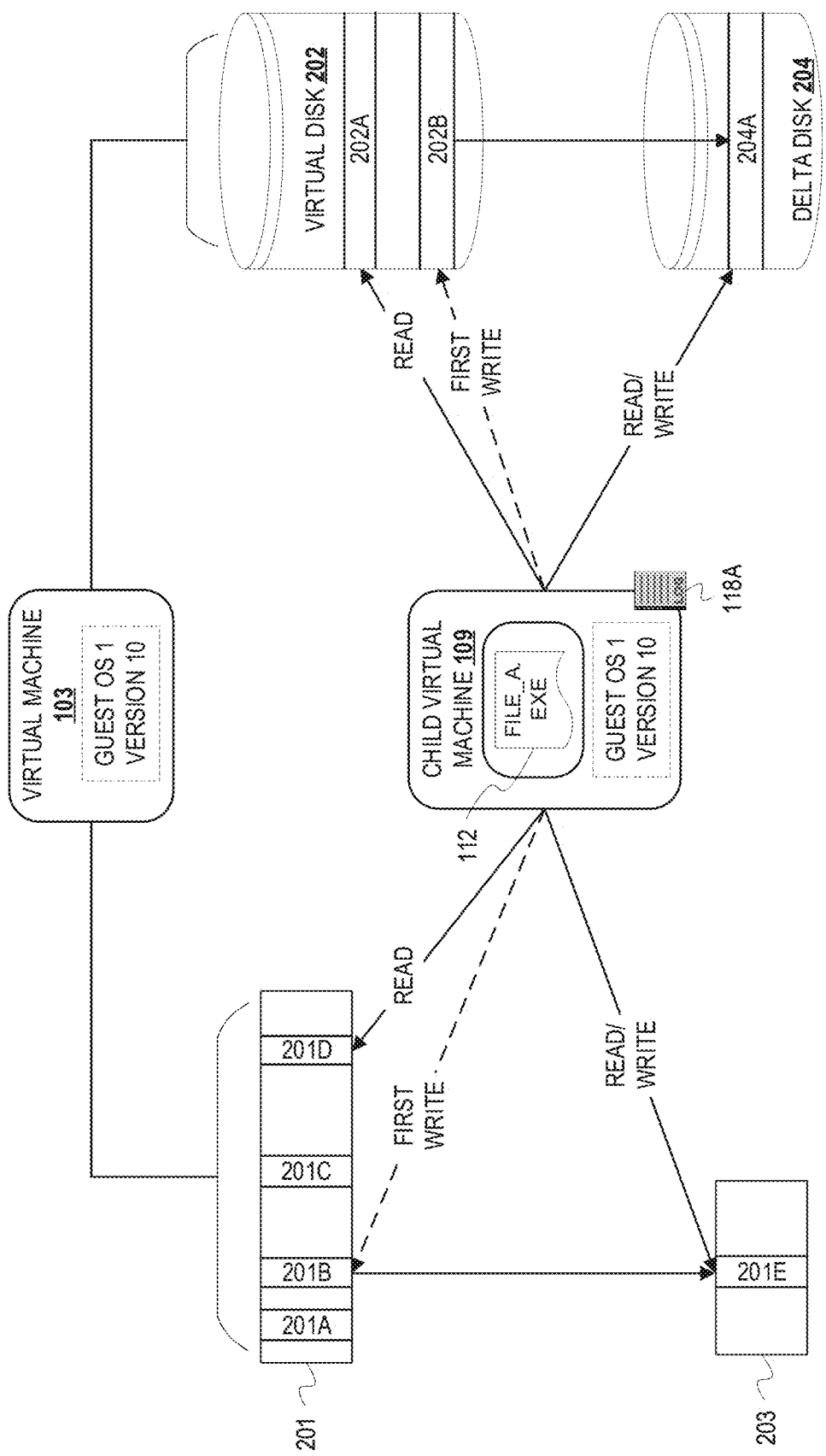
FIG. 2 depicts a conceptual diagram of high-level management of data shared between parent and child processes corresponding to parent and child virtual machines while monitoring behavior of a software sample loaded into the child virtual machine.

FIG. 2 depicts a conceptual diagram of high-level management of data shared between parent and child processes corresponding to parent and child virtual machines while monitoring behavior of a software sample loaded into the child virtual machine. FIG. 2 depicts the virtual machine 103 and child virtual machine 109 which have installed a guest operating system with which the file 112 is compatible as described in reference to FIG. 1. The virtual machine 103 and child virtual machine 109 run in a parent process and a child process, respectively. The parent process corresponding to the virtual machine 103 has been allocated a virtual disk 202 and virtual memory which maps to physical pages 201A-D (i.e., page frames) of memory 201. FIG. 2 depicts the state of the memory 201 and virtual disk 202 at the time of the fork of the child process from the parent process (i.e., at the time which operations described in reference to stage C in FIG. 1 commence). The memory 201 includes the physical pages 201A-D to which the memory pages written by the parent process map. The virtual disk 202 includes data blocks 202A-B to which the parent process has written.

Following the fork issued from the process of the virtual machine 103, because the issued fork is implemented with copy-on-write, physical pages 201A-D of the memory 201 are marked as read-only in the page table. A reference count can then be initialized for the physical pages 201A-D which is maintained to indicate the number of references to the physical pages 201A-D. Copying of the virtual disk 202 is also handled so that the virtual disk 202 of the parent process will remain unmodified by the child process. A snapshot of the virtual disk 202 is generated to provide the child process with a read-only copy of the data written to the virtual disk by the parent process (i.e., the data blocks 202A-B), and a delta disk 204 is created for the child process. The delta disk 204 provides a writable disk for the child process for write requests indicating the read-only data blocks of the virtual disk 202.

The file 112 is then loaded into the child virtual machine 109 for monitoring and recording of its execution behavior as described at stage D of FIG. 1. At this stage, the child process can access the physical pages 201A-D to which pages of virtual memory map and data blocks 202A-B as read-only data. For example, the child process may read data stored in a virtual page which maps to the physical page 201D from memory and the data block 202A as a result of read requests made while monitoring execution behavior of the file 112 and recording indications of its behavior as log data 118A. Upon the first write attempt to a virtual page which maps to the physical page 201B by the child process, the write attempt is intercepted (e.g., by the kernel of the host operating system), a new physical page 201E is allocated and initialized with the data stored in the physical page 201B, and the reference count maintained for the physical page 201B is decremented. The data to write for the child process can then be written to the physical page 201E, with subsequent read and write operations made by the child process to the corresponding virtual page completed with the physical page 201E. Memory 203, which includes the physical page 201E, indicates the physical memory allocated to the child process as a result of copy-on-write operations. Similarly, upon the first write attempt to the data bock 202B, the write request is redirected to the delta disk 204 and written to a data block 204A. The child process can subsequently read and write to the data block 204A of the delta disk.

Once execution behavior of the file 112 in the child virtual machine 109 has been monitored and recorded as log data 118A, the child virtual machine 109 can be terminated and the log data 118A collected for analysis as described at stage E of FIG. 1. When the child virtual machine 109 is terminated (e.g., based on killing the child process), physical pages of the memory 203 can be indicated as free or available and the delta disk 204 discarded without impacting the parent process and the virtual machine 103. This allows for the physical pages 201A-D to which virtual memory of the parent process maps and virtual disk 202 corresponding to the parent process to remain unmodified by the child process throughout the monitoring of the file 112 in the child virtual machine 109 and between subsequent malware analysis instances of different software samples loaded in child virtual machines forked from the virtual machine 103.

Figure 3:
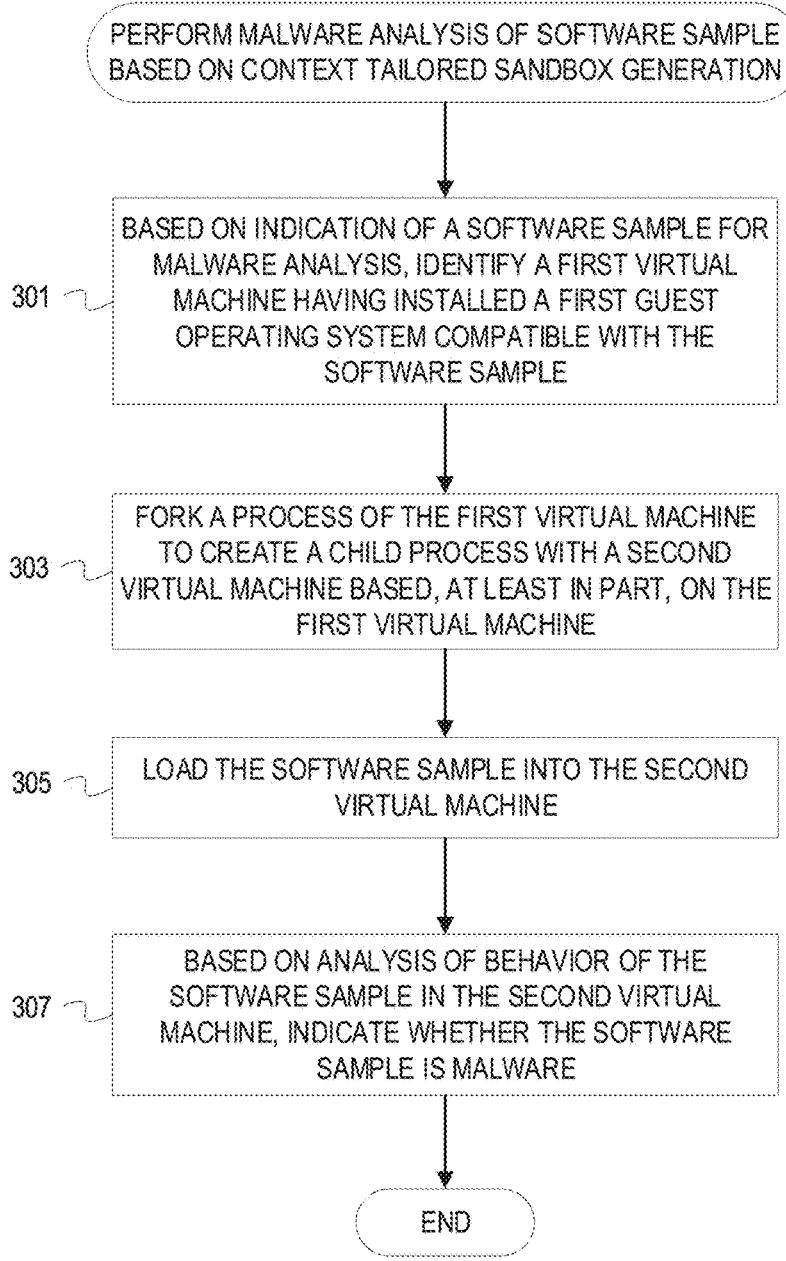
FIG. 3 depicts a flowchart of example operations for performing malware analysis of a software sample based on context tailored sandbox generation.

FIG. 3 depicts a flowchart of example operations for performing malware analysis of a software sample based on context tailored sandbox generation. The example operations are described with reference to a virtual machine forking manager (hereinafter the "VM forking manager") for consistency with the earlier figures.

At block 301, based on indication of a software sample for malware analysis, the VM forking manager identifies a first virtual machine having installed a first guest operating system compatible with the software sample. The VM forking manager can determine a guest operating system which is compatible with the software sample based on a type of the software sample. The software sample may be indicated for malware analysis based on having been inserted into a queue accessible to the VM forking manager for queuing software samples having the same type as the software sample.

At block 303, the VM forking manager forks a process of the first virtual machine to create a child process with a second child virtual machine based, at least in part, on the first virtual machine. The VM forking manager can issue an instruction or command to fork a child process from the process corresponding to the first virtual machine in which the second virtual machine can be created. For instance, a fork system call can be made from the process corresponding to the first virtual machine, where the fork system call may be implemented to use copy-on-write for copying of memory to the child process. The second virtual machine created in the child process will also have installed the first guest operating system with which the software sample is compatible.

At block 305, the VM forking manager loads the software sample into the second virtual machine. The VM forking manager can load the software sample into the second virtual machine which is created based on the fork from the process of the first virtual machine for a sandbox analysis of the software sample. Once loaded into the second virtual machine, behavior of the software sample can be monitored and recorded by the child virtual machine (e.g., to a log file of the child virtual machine).

At block 307, based on analysis of behavior of the software sample in the second virtual machine, the VM forking manager indicates whether the software sample is malware. The VM forking manger can collect log data from the second virtual machine which was generated from monitoring and recording behavior of the software sample in the second virtual machine. The VM forking manager then analyzes the log data to determine whether the log data indicates malicious behavior by the software sample, such as whether behavior patterns indicated in the log data correspond to malicious activity. If the log data indicates malicious behavior by the software sample, the VM forking manager indicates that the software sample is malware.

Figure 4:
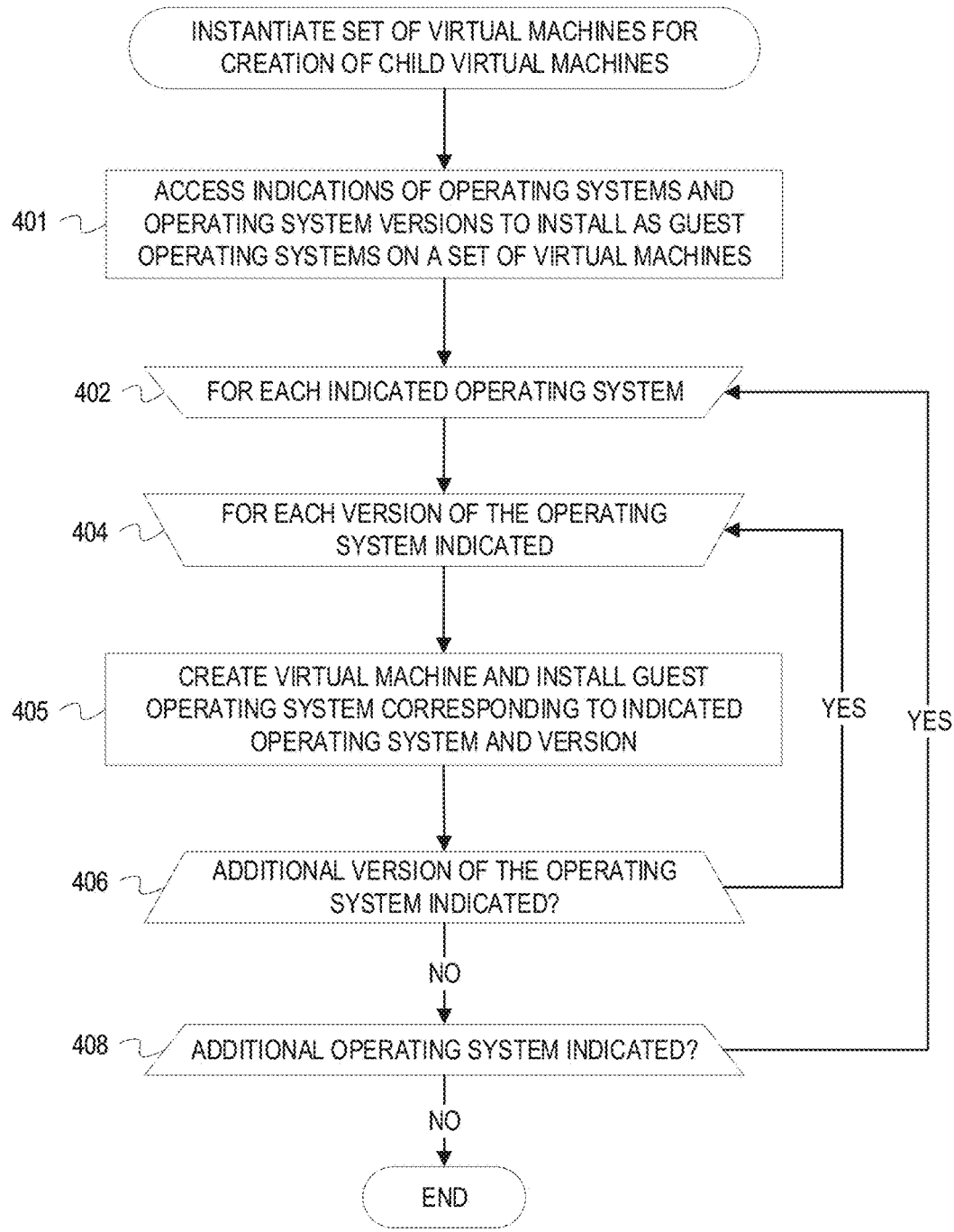
FIG. 4 depicts a flowchart of example operations for instantiating a set of virtual machines for subsequent creation of child virtual machines.

FIG. 4 depicts a flowchart of example operations for instantiating a set of virtual machines for subsequent creation of child virtual machines. The example operations are described with reference to a virtual machine forking manager (hereinafter the "VM forking manager") for consistency with the earlier figures.

At block 401, the VM forking manager accesses indications of operating systems and operating system versions to install as guest operating systems on a set of virtual machines. For example, the VM forking manager can maintain or have access to a configuration file which indicates one or more operating systems to install as a guest operating system on a respective virtual machine. The configuration file may indicate the operating systems, version(s) of each operating system, and virtual machine configuration information.

At block 402, the VM forking manager begins instantiating virtual machines for each indicated operating system. The VM forking manager instantiates different virtual machines with different guest operating systems installed so that a controlled execution environment can be provided for malware analysis of software samples of varying types (e.g., PE files, Portable Document Format (PDF) files, document files, archive files, etc.).

At block 404, the VM forking manager begins instantiating virtual machines for each version of the indicated operating system. In some cases, malicious code of a software sample may be triggered based on utilizing features of a specific version(s) of an operating system rather than any version of the operating system. The VM forking manager may thus instantiate multiple virtual machines with different versions of the same guest operating system so that malware specific to a certain version of the guest operating system will not go undetected.

At block 405, the VM forking manager creates a virtual machine and installs a guest operating system corresponding to the indicated operating system and version on the virtual machine. The VM forking manager may create the virtual machine based on a virtual machine configuration indicated in the configuration file accessed to determine the operating systems and versions to install as guest operating systems. The resulting virtual machine that is launched will be running the indicated operating system and operating system version.

At block 406, the VM forking manager determines whether an additional version of the operating system is indicated. If an additional version of the operating system is indicated, operations continue at block 404. If no additional versions of the operating system are indicated, operations continue at block 408.

At block 408, the VM forking manager determines whether an additional operating system is indicated. If an additional operating system is indicated, operations continue at block 402. If no additional operating systems are indicated, operations are complete. The set of virtual machines which are created can remain running and available for forking to quickly create a child virtual machine based on the virtual machine that is "forked" in which a software sample can be loaded and its execution behavior monitored and recorded.

Figure 5:
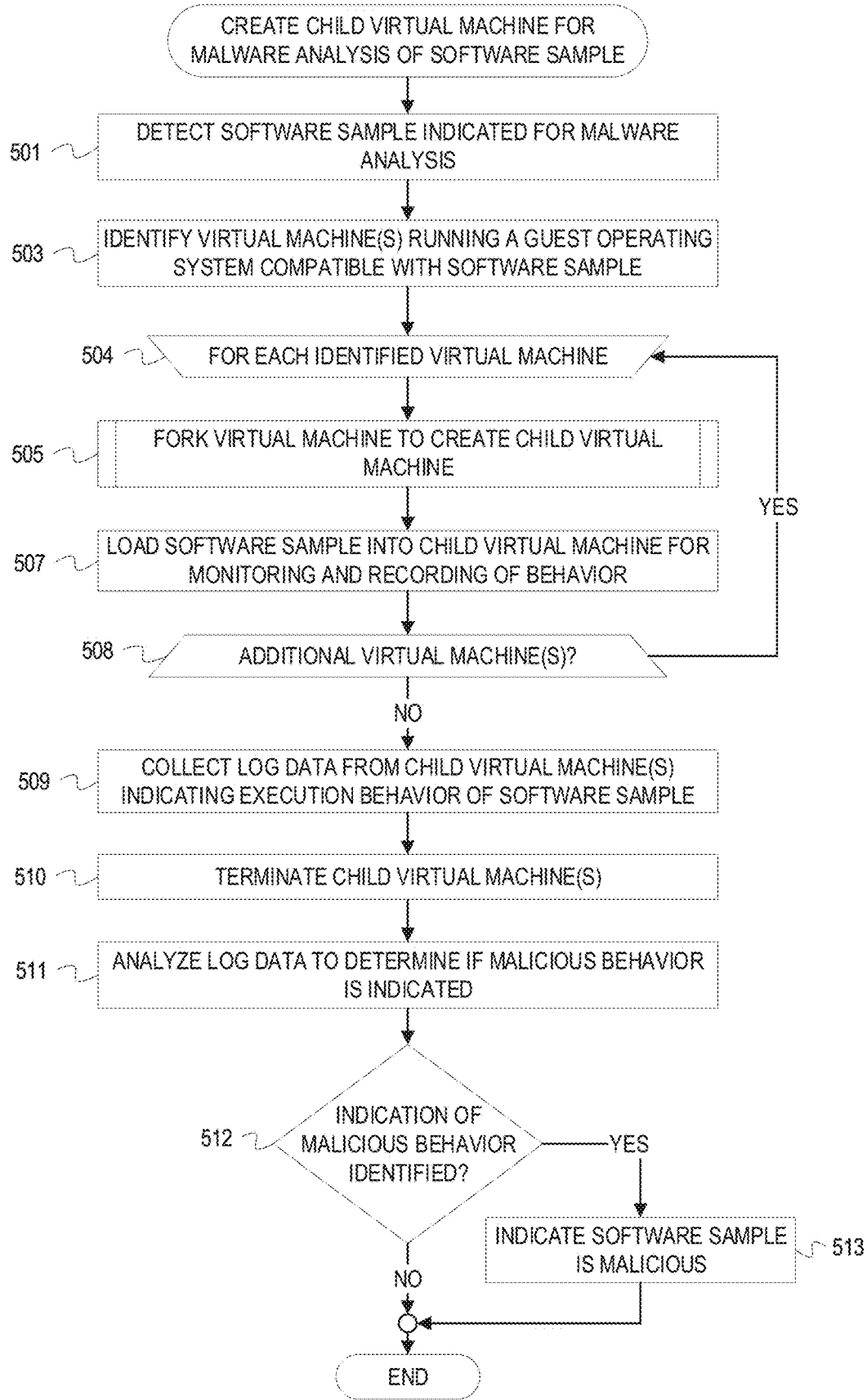
FIG. 5 depicts a flowchart of example operations for creating a child virtual machine and performing malware analysis of a software sample based on loading the software sample into the child virtual machine.

FIG. 5 depicts a flowchart of example operations for creating a child virtual machine and performing malware analysis of a software sample based on loading the software sample into the child virtual machine. The example operations are described with reference to a virtual machine forking manager (hereinafter the "VM forking manager") for consistency with the earlier figures.

At block 501, the VM forking manager detects a software sample indicated for malware analysis. The software sample may be indicated for malware analysis based on having been inserted into a queue maintained by or accessible to the VM forking manager upon detection by a firewall or other network component which monitors network traffic. The VM forking manager can detect the software sample based on determining that the software sample has been queued for malware analysis.

At block 503, the VM forking manager identifies one or more virtual machines running a guest operating system which is compatible with the software sample. The VM forking manager identifies one or more virtual machines which were previously instantiated with a guest operating system with which the software sample is compatible. For instance, the identified virtual machine(s) may be running different versions of a first operating system. The VM forking manager can determine a guest operating system which is compatible with the software sample based on a type of the software sample, such as a sample type to which the queue in which the software sample was inserted corresponds.

At block 504, the VM forking manager begins preparing virtual machines that are "forked" from the identified virtual machines for malware analysis of the software sample. As described above, forking of a virtual machine refers to forking from a process of the virtual machine and creating a child virtual machine that is a copy of the virtual machine in the resulting child process. The VM forking manager creates child virtual machines based on each of the virtual machines identified as running a guest operating system compatible with the software sample.

At block 505, the VM forking manager forks the virtual machine to create a child virtual machine. The VM forking manager can pause the virtual machine and subsequently issue a fork of the virtual machine. For instance, the VM forking manager can communicate an instruction or command to issue a fork from the process in which the virtual machine was instantiated to create a child process for the child virtual machine (e.g., via a fork( ) system call issued from the process). The call to fork which is issued is a copy-on-write implemented fork so that virtual memory pages of the child process will refer to pages of physical memory of the parent process until a write request to read-only memory is made by the child process, after which physical memory is newly allocated to the child process. User mode-accessible resources of the parent process will be copied to the child process as a result of the fork operation. The remaining system resources are then copied to the child process through either "deep copying" as described above or by creating new instances for the child process so that the child virtual machine can run independently of its parent. For instance, for the virtual CPU, a deep copy of register data corresponding to the virtual CPU of the parent process is made for the virtual CPU allocated to the child process. A snapshot of the virtual disk corresponding to the parent process and a delta disk are also generated for the child process to provide the child process with a read-only copy of data written to the virtual disk and a writable disk, respectively. Forking of a virtual machine to create a child virtual machine is described in additional detail in reference to FIG. 6.

At block 507, the VM forking manager loads the software sample into the child virtual machine for monitoring and recording of behavior. The child virtual machine provides a controlled execution environment for the software sample in which its behavior can be monitored and recorded to facilitate a determination of whether the software sample comprises malware. Monitoring and recording of execution behavior of the software sample can commence upon its load into the child virtual machine. For instance, execution behavior of the software sample can be monitored as a result of opening, executing, and/or otherwise manipulating the software sample (e.g., by using a series of test cases determined based on a type of the software sample). Execution behavior may be recorded to a log file of the child virtual machine. During monitoring of the software sample, write operations made by the child process to memory and disk storage will be made to memory allocated to the child process at the first write attempt through copy-on-write and to the delta disk, respectively, so that the virtual memory and virtual disk of the parent process will be unaffected as a result of the monitoring of the software sample.

At block 508, the VM forking manager determines if additional child virtual machines should be created. The VM forking manager can determine if each of the virtual machine(s) identified at block 503 have been "forked" to create a respective child virtual machine for malware analysis of the software sample. If one or more additional child virtual machines should be created, operations continue at block 504. If no additional child virtual machines should be created, operations continue at block 509.

At block 509, the VM forking manager collects log data from the child virtual machine(s) which indicate execution behavior of the software sample. For cases in which more than one child virtual machine was created for malware analysis of the software sample, because monitoring of the software sample in each child virtual machine may complete at different times, the VM forking manager can collect the log data from each child virtual machine as the monitoring of the software sample in the virtual machine is completed. The child virtual machine may be configured to report log data to the VM forking manager (e.g., via an agent with which the VM forking manager can communicate).

At block 510, the VM forking manager terminates the child virtual machine(s). A child virtual machine may be terminated after the monitoring has completed and the log data has been collected by the VM forking manger. The VM forking manager can issue an instruction or command to terminate the child virtual machine(s) based on terminating the respective child process(es), such as by issuing a kill( ) system call for each child process which indicates the respective process ID. Because each of the child virtual machines were created in a separate process from that of the virtual machine from which it was forked, killing the process of the child virtual machine will not affect the parent process, so the virtual machine of the parent process will continue to run and will be available for subsequent forking upon identification of additional software samples indicated for malware analysis. Termination of the child virtual machine will also result in discarding the delta disk created for the child virtual machine and indicating the memory written to by the child process as available without affecting the virtual disk and memory of the parent process.

At block 511, the VM forking manger analyzes log data to determine if malicious behavior is indicated. The log data indicates behavior patterns of the software sample based on monitoring the software sample in each of the child virtual machines. The VM forking manager analyzes log data collected from each of the child virtual machines against one or more criteria, rules, etc. for malware detection. For instance, the VM forking manager may maintain rules or criteria which indicate behavior patterns corresponding to malicious activity. Malicious behavior can thus be determined to be indicated in the log data if one or more behavior patterns indicated in the log data satisfy a first of the rules or criteria.

At block 512, the VM forking manager determines if indications of malicious behavior can be identified. The VM forking manger determines that indications of malicious behavior can be identified if the log data collected from at least one child virtual machine indicates malicious behavior of the software sample based on the analysis at block 511. If indications of malicious behavior can be identified, operations continue at block 513. If indications of malicious behavior cannot be identified, operations are complete.

At block 513, the VM forking manager indicates that the software sample is malicious. For instance, the VM forking manager may generate a notification, alert, etc. which indicates that the software sample is malicious. Alternatively or in addition, the VM forking manager may notify a network component at which the software sample was detected (e.g., a firewall) that subsequent network traffic which includes the software sample should be blocked.

Figure 6:
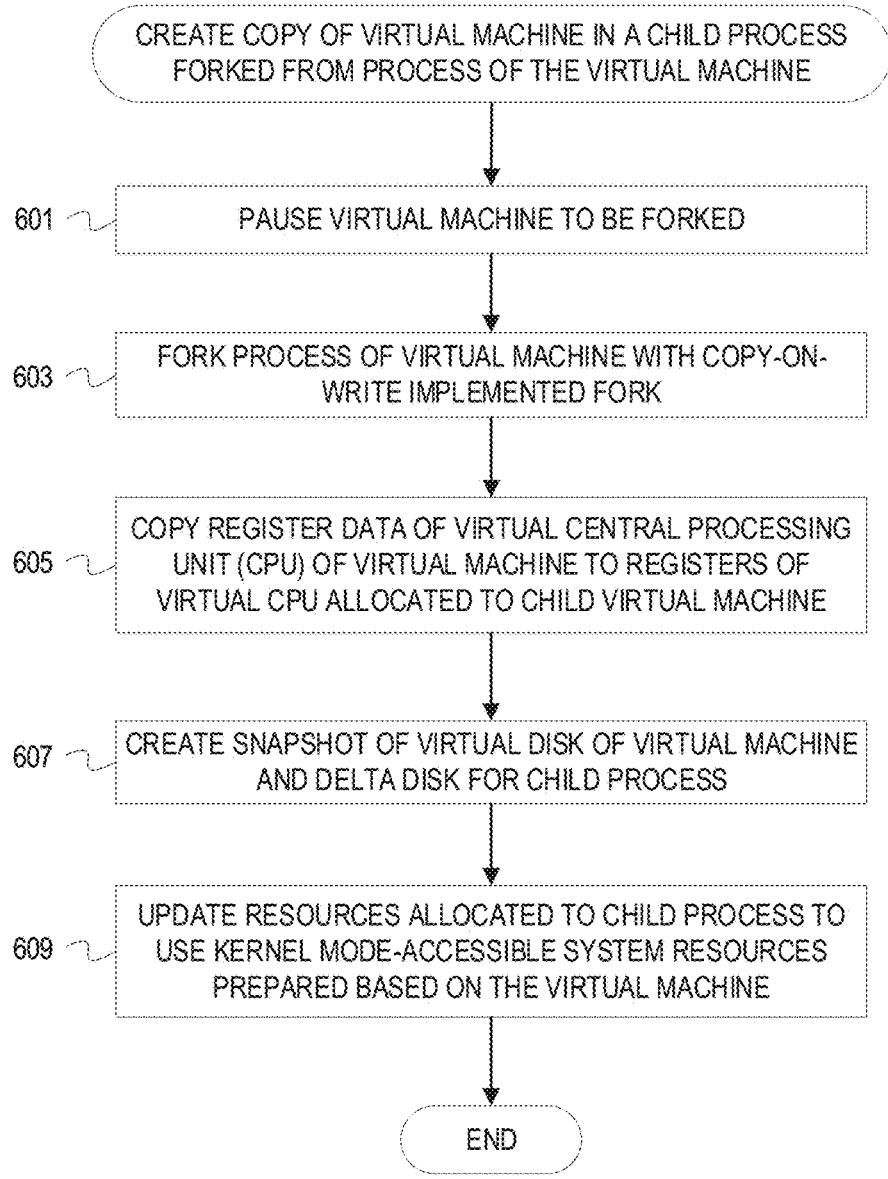
FIG. 6 depicts a flowchart of example operations for creating a copy of a virtual machine in a child process that is forked from a process corresponding to the virtual machine.

FIG. 6 depicts a flowchart of example operations for creating a copy of a virtual machine in a child process that is forked from a process corresponding to the virtual machine. The example operations are described with reference to a virtual machine forking manager (hereinafter the "VM forking manager") for consistency with the earlier figures.

At block 601, the VM forking manager pauses a virtual machine to be forked. The VM forking manager alters the state of the virtual machine from active to paused to temporarily suspend read/write operations in the process while creating the child virtual machine that is based on the virtual machine. For instance, the VM forking manager can issue a command to quiesce or suspend the virtual machine.

At block 603, the VM forking manager forks a process of the virtual machine with a copy-on-write implemented fork. The VM forking manager may make or communicate an instruction to the process of the virtual machine to make a system call to fork( ) from the process of the virtual machine. The fork( ) which is called is a copy-on-write implemented fork to provide improved performance when creating the child virtual machine in the child process. For instance, rather than copying all physical memory corresponding to virtual memory of the parent process at the time of the fork, pages of physical memory to which virtual pages of the parent process map can be marked read-only (e.g., in the respective entries in the page table) and reference counts for each physical page initialized at the time of the process fork. Pages of the virtual memory of the child process will then initially reference the same physical memory as the pages of the virtual memory of the parent process. Copying and allocation of new physical memory for the child process will be deferred until first attempted write to memory marked as read-only.

At block 605, the VM forking manager initiates a copy of register data associated with a virtual CPU of the virtual machine to registers associated with a virtual CPU allocated to the child virtual machine through a "deep copy." As described in reference to FIG. 1, copying of the register data associated with the virtual CPU of the parent process is handled through a deep copy so that copies of register data themselves are made for the child process rather than copying references to the register data alone. Register data for which a deep copy is performed include data stored in general-purpose registers, control register, debug register, model-specific register(s), etc. In some implementations, hardware-assisted virtualization may be enabled. In addition to the deep copy of the virtual CPUs, a deep copy can also be performed for structures associated with the implementation of hardware-assisted virtualization (e.g., deep copies of virtual machine control structure data, pointer(s) for nested paging implementations, etc.).

At block 607, the VM forking manager creates a snapshot of the virtual disk of the virtual machine and a delta disk for the child process. The snapshot of the virtual disk which is created provides a read-only copy of the data written to the virtual disk by the parent process for access by the child process. The delta disk is created for the child process to use as a writable disk. The creation of a delta disk for disk write operations by the child process allows for disk writes to data blocks of the virtual disk marked read-only to be redirected to the delta disk on the first write attempt. The delta disk will thus provide disk storage which is unique to the child process and can be modified or discarded without affecting the virtual disk of the parent process.

At block 609, the VM forking manager updates resources allocated to the child process to use the kernel-mode accessible system resources which were prepared based on the virtual machine. Once system resources have been prepared, resources of the child process are updated to allow the child virtual machine to run such that the kernel mode-accessible system resources prepared for the child process will be used rather than those of the parent. For instance, the VM forking manager may update a virtual machine control structure created and maintained for the child virtual machine, a pointer(s) maintained for a page table or nested page table which tracks physical memory allocated for the child process in which the child virtual machine runs, a program counter corresponding to the virtual CPU, etc.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 510 and 511 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
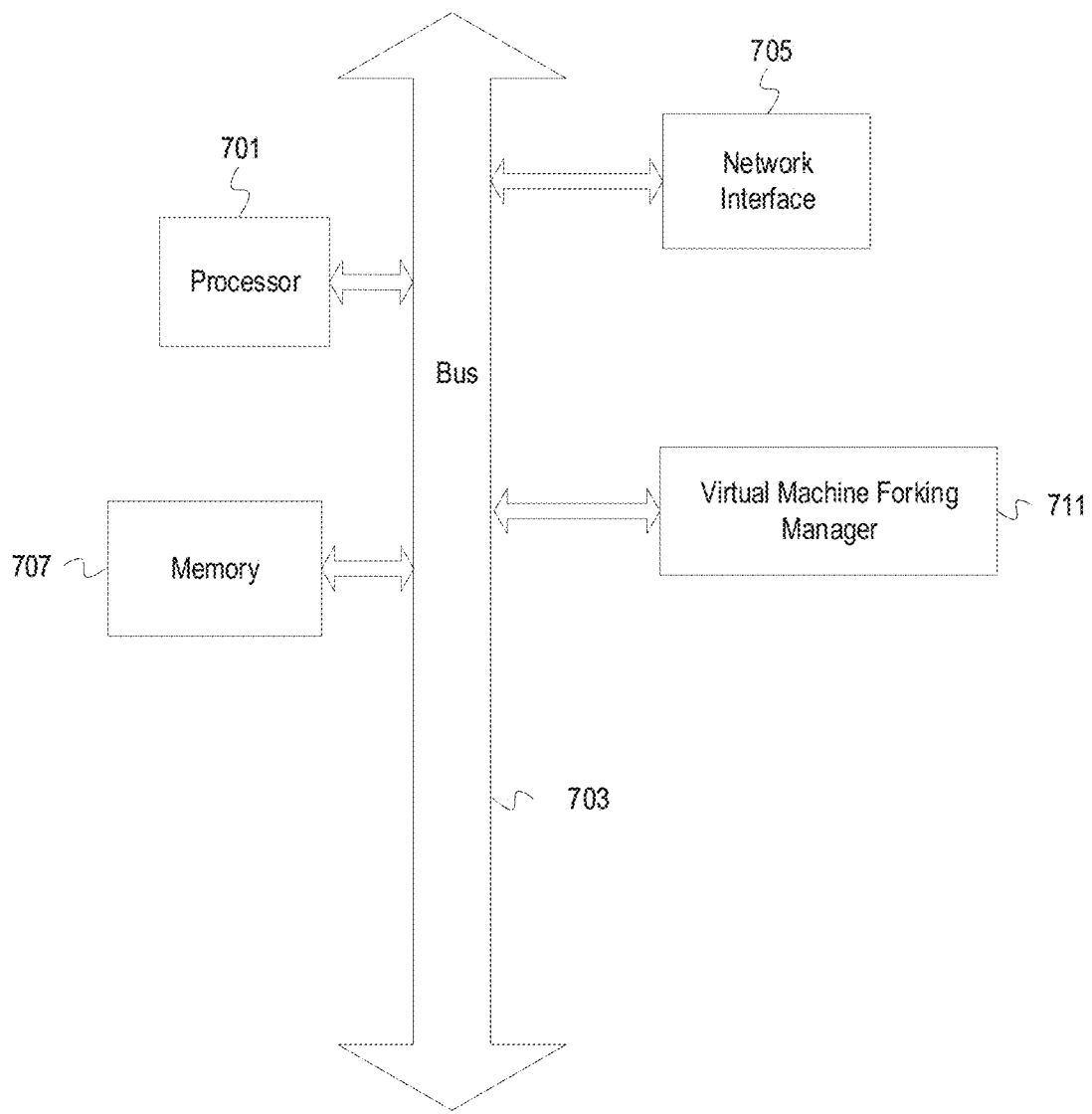
FIG. 7 depicts an example computer system with a virtual machine forking manager.

FIG. 7 depicts an example computer system with a virtual machine forking manager. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes virtual machine forking manager 711. The virtual machine forking manager 711 manages forking of a child process(es) from a process(es) of a virtual machine(s) having installed a guest operating system with which a software sample indicated for malware analysis is compatible to create a child virtual machine(s) and indicates if the software sample is malware based on monitoring execution behavior of the software sample in the child virtual machine(s). Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for malware analysis of software samples based on virtual machine forking as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
creating a plurality of virtual machines and installing one of a plurality of guest operating systems on each of the plurality of virtual machines, wherein the plurality of guest operating systems comprises different operating systems;
based on indication of a first software sample for malware analysis, identifying a first virtual machine of the plurality of virtual machines having installed thereon a first guest operating system compatible with the first software sample, wherein the first guest operating system is included in the plurality of guest operating systems;
creating a second virtual machine based on issuing a process fork for the first virtual machine, wherein creating the second virtual machine comprises creating a deep copy of first resources of the first virtual machine and marking second resources of the first virtual machine as read-only for implementation of copy-on-write, wherein the first resources comprise data stored in registers of one or more virtual central processing units (CPUs) of the first virtual machine and the second resources comprise a virtual disk and memory corresponding to the first virtual machine;
loading the first software sample into the second virtual machine; and
based on analysis of behavior of the first software sample in the second virtual machine, indicating whether the first software sample is malware.

2. The method of claim 1 further comprising:
identifying a third virtual machine having installed a second of the plurality of guest operating systems compatible with the first software sample, wherein the second guest operating system is also included in the plurality of guest operating systems;
issuing a process fork for the third virtual machine to create a fourth virtual machine based, at least in part, on the third virtual machine; and
loading the first software sample into the fourth virtual machine,
wherein indicating whether the first software sample is malware is also based on analysis of behavior of the first software sample in the fourth virtual machine.

3. The method of claim 2, wherein the first and second guest operating systems compatible with the first software sample are different versions of a same operating system.

4. The method of claim 1, further comprising collecting log data from the second virtual machine, wherein the log data comprise indications of the behavior of the first software sample in the second virtual machine, wherein the analysis of the behavior is based on analysis of the log data.

5. The method of claim 1, wherein the second resources comprise physical memory pages mapped by virtual pages corresponding to the first virtual machine, wherein creating the second virtual machine comprises marking the physical memory pages as read-only based on issuing the process fork.

6. The method of claim 1, wherein creating the second virtual machine comprises generating a read-only version of the virtual disk corresponding to the first virtual machine and generating a delta disk for the second virtual machine.

7. The method of claim 1, further comprising pausing or quiescing the first virtual machine.

8. The method of claim 1, wherein creating the plurality of virtual machines and installing one of the plurality of guest operating systems on each of the plurality of virtual machines is based, at least in part, on a configuration file indicating the plurality of guest operating systems and, for each of the plurality of guest operating systems, a corresponding operating system version.

9. The method of claim 1 further comprising determining a type of the first software sample, wherein identifying the first virtual machine is based, at least in part, on the determined type of the first software sample.

10. The method of claim 9 further comprising:
inserting, based on the determined type of the first software sample, the first software sample into a first queue of a plurality of queues each of which corresponds to a different software type; and
determining a set of one or more operating systems compatible with the first software sample based on insertion of the first software sample into the first queue.

11. A non-transitory, machine-readable medium having instructions stored thereon that are executable by a computing device, the instructions to:
instantiate a plurality of virtual machines having installed corresponding ones of a plurality of guest operating systems, wherein the plurality of guest operating systems comprises different operating systems;
determine a set of one or more operating systems compatible with a first software sample indicated for malware analysis;
identify which of the plurality of virtual machines has installed the set of one or more compatible operating systems;
for each identified virtual machine of the plurality of virtual machines, create a child virtual machine based on issuance of a process fork for the identified virtual machine, wherein the instructions to create the child virtual machine comprise instructions to create a deep copy of first resources of the identified virtual machine and to provide the child virtual machine with a read-only copy of second resources of the identified virtual machine, wherein the first resources comprise data stored in registers of one or more virtual central processing units (CPUs) of the identified virtual machine and the second resources comprise a virtual disk and memory of the identified virtual machine; and
load the first software sample into each created child virtual machine for malware analysis in each created child virtual machine.

12. The non-transitory, machine-readable medium of claim 11, further comprising instructions to indicate whether the first software sample is malware based on analysis of log data generated by each child virtual machine, wherein the log data comprise indications of behavior of the first software sample.

13. The non-transitory, machine-readable medium of claim 11 further having instructions to determine type of the first software sample, wherein the instructions to determine the set of one or more compatible operating systems comprise the instructions to determine the set of one or more compatible operating systems based on the type of the first software sample.

14. The non-transitory, machine-readable medium of claim 11, wherein the instructions to provide the child virtual machine with the read-only copy of second resources of the identified virtual machine comprise instructions to mark physical memory pages mapped by virtual pages of the identified virtual machine as read-only and generate a read-only version of the virtual disk of the identified virtual machine and generate a delta disk for the child virtual machine.

15. An apparatus comprising:
a processor; and
a computer-readable medium having instructions stored thereon that are executable by the processor to cause the apparatus to,
  instantiate a plurality of virtual machines having installed corresponding ones of a plurality of guest operating systems, wherein the plurality of guest operating systems comprises different operating systems;
  based on identification of a software sample indicated for malware analysis, determine at least a first virtual machine of the plurality of virtual machines having installed a first guest operating system with which the software sample is compatible, wherein the plurality of guest operating systems includes the first guest operating system;
  create a second virtual machine based on issuance of a process fork for the first virtual machine, wherein the instructions to create the second virtual machine comprise instructions to provide the second virtual machine a read-only version of a virtual disk and memory corresponding to the first virtual machine and a deep copy of data stored in virtual central processing unit (CPU) registers of the first virtual machine; and
  load the software sample into the second virtual machine for monitoring of behavior.

16. The apparatus of claim 15, further comprising instructions executable by the processor to cause the apparatus to determine with which of the plurality of guest operating systems the software sample is compatible based, at least in part, on a type of the software sample.

17. The apparatus of claim 15, further comprising instructions executable by the processor to cause the apparatus to indicate whether the software sample is malware based on analysis of monitored behavior of the software sample in the second virtual machine.

18. The apparatus of claim 17, further comprising instructions executable by the processor to cause the apparatus to collect log data generated by the second virtual machine, wherein the log data comprise indications of monitored behavior of the software sample, and wherein the analysis of monitored behavior is based on the log data.

19. The method of claim 1, wherein creating the deep copy of the first resources of the first virtual machine comprises copying data stored in the registers of the one or more virtual CPUs of the first virtual machine into registers of one or more virtual CPUs of the second virtual machine.

20. The non-transitory, machine-readable medium of claim 11, wherein the instructions to create the deep copy of the first resources of the identified virtual machine comprise instructions to copy data stored in the registers of the one or more virtual CPUs of the identified virtual machine into registers of one or more virtual CPUs of the child virtual machine.

* * * * *